United States Patent
Mandal et al.

(10) Patent No.: US 9,171,098 B2
(45) Date of Patent: Oct. 27, 2015

(54) DECOMPOSING MARKUP LANGUAGE ELEMENTS FOR ANIMATION

(75) Inventors: Aditi Mandal, Bothell, WA (US); Arye Gittelman, Mercer Island, WA (US); Lionel Robinson, Bothell, WA (US); Joy Seth, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 677 days.

(21) Appl. No.: 13/249,269

(22) Filed: Sep. 30, 2011

(65) Prior Publication Data

US 2013/0086463 A1   Apr. 4, 2013

(51) Int. Cl.
| | |
|---|---|
| *G06F 17/00* | (2006.01) |
| *G06F 17/30* | (2006.01) |
| *G06F 17/24* | (2006.01) |
| *G06T 13/00* | (2011.01) |
| *G06F 9/44* | (2006.01) |

(52) U.S. Cl.
CPC ........ *G06F 17/30905* (2013.01); *G06F 9/4443* (2013.01); *G06F 17/246* (2013.01); *G06T 13/00* (2013.01)

(58) Field of Classification Search
CPC ....... G06T 13/00; G06F 17/00; G06F 17/246; G06F 17/30896
USPC ................... 715/234, 235, 212; 345/473, 619
See application file for complete search history.

(56) References Cited

U.S. PATENT DOCUMENTS

| | | | |
|---|---|---|---|
| 6,185,582 B1 * | 2/2001 | Zellweger et al. | 715/212 |
| 6,256,649 B1 * | 7/2001 | Mackinlay et al. | 715/212 |
| 7,000,184 B2 * | 2/2006 | Matveyenko et al. | 715/235 |
| 8,131,815 B1 * | 3/2012 | Perelman et al. | 709/217 |
| 8,164,596 B1 * | 4/2012 | Bech | 345/473 |
| 8,234,564 B2 * | 7/2012 | Drieu et al. | 715/235 |

(Continued)

FOREIGN PATENT DOCUMENTS

| | | |
|---|---|---|
| CN | 101681523 A | 3/2010 |
| CN | 101882075 A | 11/2010 |

OTHER PUBLICATIONS

James Padolsey; "How to Load in and Animate Content with jQuery"; http://code.tutsplus.com/tutorials/how-to-load-in-and-animate-content-with-jquery--net-26; 26 pages.*

(Continued)

*Primary Examiner* — Scott Baderman
*Assistant Examiner* — Benjamin J Smith
(74) *Attorney, Agent, or Firm* — Thomas Wong; Danielle Johnson-Holmes; Micky Minhas (57) ABSTRACT

Embodiments prepare a markup language (ML) element for animation. A request to perform at least one animation on at least one ML element is intercepted or received. One or more animation preparation attribute values are defined based at least on the requested animation and current attribute values of the ML element. The ML element is altered to include the defined animation preparation attribute values, and an animation engine performs the animation of the altered ML element. The animation preparation attributes and values (e.g., style elements) may be reset, removed, or otherwise modified after animation. In some embodiments, a library of application programming interfaces (APIs) enable web browsers to request animations of legacy hypertext markup language (HTML) elements for consumption by animation engines based on JAVASCRIPT scripting or cascading style sheets (CSS).

20 Claims, 5 Drawing Sheets

(56) References Cited

U.S. PATENT DOCUMENTS

| | | | |
|---|---|---|---|
| 8,429,604 B1* | 4/2013 | Blas et al. | 717/113 |
| 2002/0010707 A1* | 1/2002 | Chang et al. | 707/500 |
| 2002/0178290 A1* | 11/2002 | Coulthard et al. | 709/246 |
| 2004/0205830 A1 | 10/2004 | Kaneko | |
| 2004/0233201 A1* | 11/2004 | Calkins et al. | 345/473 |
| 2005/0044541 A1* | 2/2005 | Parthasarathy et al. | 717/173 |
| 2005/0046630 A1* | 3/2005 | Jacob et al. | 345/475 |
| 2006/0214947 A1* | 9/2006 | Boose et al. | 345/619 |
| 2007/0192687 A1* | 8/2007 | Simard et al. | 715/523 |
| 2007/0204211 A1* | 8/2007 | Paxson | 715/501.1 |
| 2008/0055269 A1* | 3/2008 | Lemay et al. | 345/173 |
| 2008/0094401 A1* | 4/2008 | Lee et al. | 345/473 |
| 2008/0120626 A1 | 5/2008 | Graffagnino et al. | |
| 2008/0165210 A1* | 7/2008 | Platzer et al. | 345/672 |
| 2008/0192056 A1* | 8/2008 | Robertson et al. | 345/440 |
| 2008/0303826 A1* | 12/2008 | Schiff | 345/473 |
| 2008/0303828 A1* | 12/2008 | Marchant et al. | 345/473 |
| 2009/0228782 A1 | 9/2009 | Fraser | |
| 2009/0228784 A1* | 9/2009 | Drieu et al. | 715/235 |
| 2009/0228838 A1 | 9/2009 | Ryan et al. | |
| 2010/0110082 A1* | 5/2010 | Myrick et al. | 345/473 |
| 2010/0123908 A1* | 5/2010 | Denoue et al. | 358/1.6 |
| 2010/0238180 A1* | 9/2010 | Kang et al. | 345/473 |
| 2010/0238181 A1* | 9/2010 | Forney et al. | 345/473 |
| 2010/0246984 A1* | 9/2010 | Cheong et al. | 382/233 |
| 2011/0037767 A1* | 2/2011 | Casanova et al. | 345/473 |
| 2011/0078560 A1* | 3/2011 | Weeldreyer et al. | 715/255 |
| 2011/0088039 A1* | 4/2011 | Tabone et al. | 718/104 |
| 2011/0090258 A1* | 4/2011 | Racic | 345/660 |
| 2011/0161440 A1* | 6/2011 | Juvet et al. | 709/206 |
| 2011/0292050 A1* | 12/2011 | Gotz | 345/441 |
| 2012/0060087 A1* | 3/2012 | Jame et al. | 715/238 |
| 2012/0297288 A1* | 11/2012 | Mansouri | 715/234 |
| 2012/0310775 A1* | 12/2012 | Laster-Fields | 705/26.41 |
| 2012/0311422 A1* | 12/2012 | Weeldreyer et al. | 715/220 |
| 2013/0036351 A1* | 2/2013 | King et al. | 715/234 |
| 2013/0050253 A1* | 2/2013 | Jooste | 345/629 |
| 2013/0132840 A1* | 5/2013 | Blas et al. | 715/719 |
| 2013/0283151 A1* | 10/2013 | Deguzman et al. | 715/239 |

OTHER PUBLICATIONS

Stackoverflow; "jQuery event order and waiting till animation complete"; 3 pages; http://stackoverflow.com/questions/2407592/jquery-event-order-and-waiting-till-animation-complete.*

Vanessa Rios; "Flash to HTML5 Conversion Tool on Adobe Labs"; http://blogs.adobe.com/conversations/2011/03/flash-to-html5-conversion-tool-on-adobe-labs.html; 11 pages.*

Google; "Swiffy"; https://www.google.com/doubleclick/studio/swiffy/; 1 page.*

"Reasons Why CSS Is Superior to Tables in Website Design", Retrieved at <<http://www.chromaticsites.com/blog/13-reasons-why-css-is-superior-to-tables-in-website-design/>>, Retrieved Date: Aug. 1, 2011, pp. 37.

"Ajax framework", Retrieved at <<http://en.wikipedia.org/wiki/Ajax_framework>>, Retrieved Date: Aug. 1, 2011, pp. 3.

".animate( )—jQuery API", Retrieved at <<http://api.jguery.com/animate>>, Retrieved Date: Aug. 16, 2011, pp. 12.

"First Office Action and Search Report Received for Chinese Patent Application No. 201210377056.X", Mailed Date: Jan. 4, 2015, 17 Pages.

* cited by examiner

DECOMPOSING MARKUP LANGUAGE ELEMENTS FOR ANIMATION

BACKGROUND

Animations in documents enhance the user experience. For example, animations improve the usability and visual appeal of a website. Example animation include deleting a table from a web page, moving a hypertext markup language (HTML) element from one position to another, or otherwise visually altering HTML elements. Developers working with established websites, however, often have to animate HTML elements written in legacy code that cannot be animated using existing animation logic based on JAVASCRIPT or cascading style sheets (CSS). Rather, with some existing systems, the developers have to manually re-write each HTML element for animation in each animation scenario. Such an ad-hoc solution specific to each legacy HTML element to be animated is time consuming, expensive, and error prone.

SUMMARY

Embodiments of the disclosure enable animation of legacy markup language (ML) elements. A computing device receives a request to perform at least one animation on at least one ML element. The ML element has one or more current attribute values associated therewith. The computing device defines one or more animation preparation attribute values based at least on the requested animation and the current attribute values. The computing device alters the ML element to include the defined animation preparation attribute values. An animation engine animates the altered ML element using at least the defined animation preparation attribute values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable animation of markup language (ML) elements. In some embodiments, legacy hypertext markup language (HTML) elements are decomposed for consumption by animation engines 108 supporting JAVASCRIPT scripting and/or cascading style sheets (such as CSS3). Application programs 204 such as browsers invoke one or more application programming interfaces (APIs) 104 that change attributes and attribute values of the ML elements (e.g., adds, alters, or removes metadata) such that content appears the same but is prepared for animation by the animation engine 108. Some aspects of the disclosure additionally reset the ML elements after animation (e.g., back to the original or legacy layout).

Exemplary operations performed by aspects of the disclosure include re-positioning the ML element, creating copies of ML elements for animations that replace content, animating a bounding box that grows to fully contain the ML element (e.g., for displaying additional text), and manipulating cells within a table (e.g., move, delete, insert, etc.).

While aspects of the disclosure are described with reference to the ML element being a hypertext markup language (HTML) element, embodiments of the disclosure are operable with any object to be animated. Further, aspects of the disclosure are not limited to animations on web pages, and instead contemplate animations in any document capable of displaying output from the animation engine 108.

Figure 1:
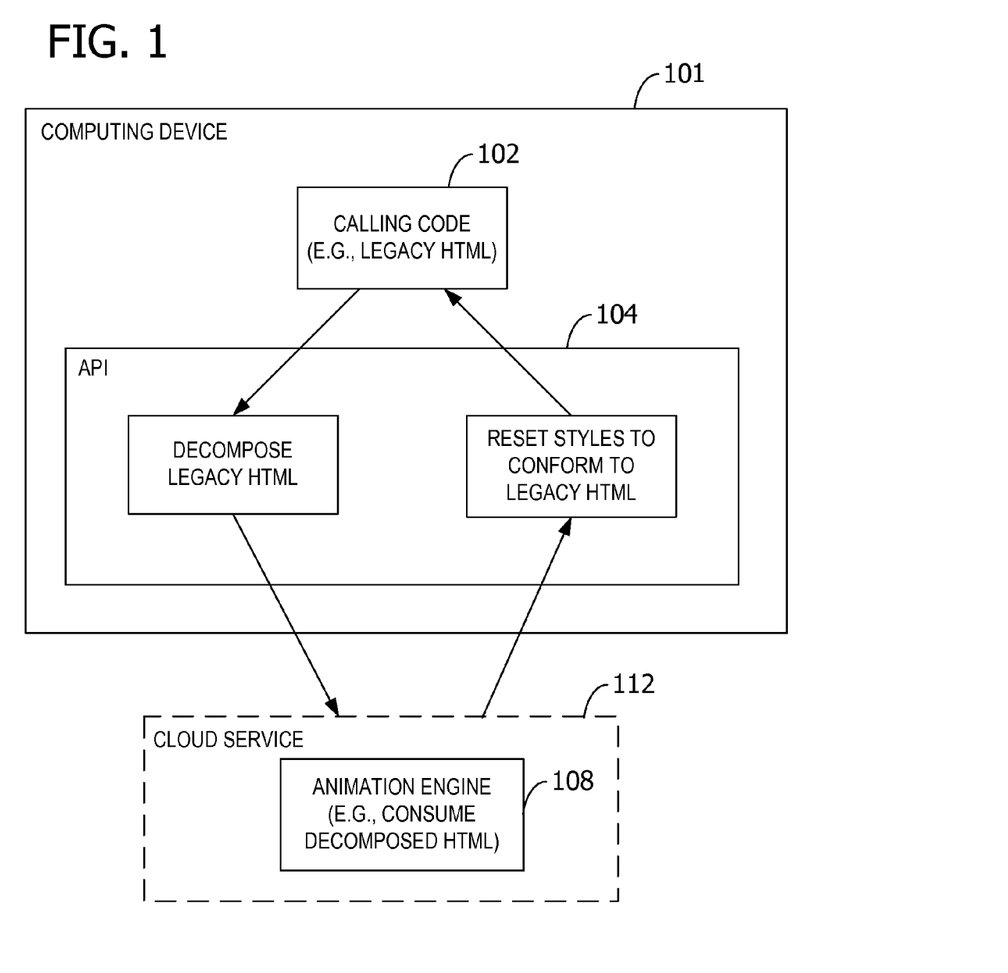
FIG. 1 is an exemplary block diagram illustrating calling code (e.g., an application program) communicating with an animation engine via an application programming interface (API).

Referring next to FIG. 1, an exemplary block diagram illustrates calling code 102 communicating with the animation engine 108 via the API 104. The calling code 102 may be the application program 204 or portion thereof that, when executed by a computing device 101, requests an animation. The animation may be requested using function calls such as provided by the API 104. In some embodiments, a plurality of APIs 104 may be available as a library. The library of APIs 104 may be loaded by the computing device 101 during compile time or runtime of the calling code 102. In other embodiments (not shown), the APIs 104 reside on a device separate from the computing device 101.

The APIs 104 include functions to decompose legacy HTML elements, objects, or code. In other embodiments, the APIs 104 decompose elements, objects, or code written in other markup languages. Decomposing the HTML element includes preparing the HTML element for animation. Examples of decomposition are described and illustrated herein, such as with reference to FIG. 4 and FIG. 5, and generally include adding or altering attributes on the HTML element to make the HTML element suitable for animation.

After the HTML element has been prepared for animation, the animation engine 108 processes the HTML element (e.g., consumes the decomposed HTML). For example, the animation engine 108 is executed by the computing device 101 to animate the HTML element and to display the animation on a display 306 associated with the computing device 101. In embodiments in which the animation engine 108 is executed by a device other than the computing device 101 executing the calling code 102 or providing the API 104, the animation engine 108 provides the animation to the computing device 101 for display. For example, the animation engine 108 may by executed by a server or a cloud service 112.

During and/or after animation, the animation engine 108 updates the state of the HTML element by modifying attributes of the HTML element. When the animation is complete, the additions or alterations to the attributes made in preparation for animation are reset such that the HTML element reflects the legacy layout. For example, another function in the API 104 receives or intercepts the HTML element after animation and conforms the HTML element with the modified attributes to a format suitable for consumption by the calling code 102. For example, styles within the HTML element after animation are conformed to legacy HTML. The conformed HTML element is then provided to, or made accessible to, the calling code 102.

Aspects of the disclosure are operable with any animation engine 108 operating in any way to animate any ML element. While described with reference to the animation engine 108 being decoupled from animation definitions 310 as next described with reference to FIG. 2, aspects of the disclosure are not limited to such embodiments.

Figure 2:
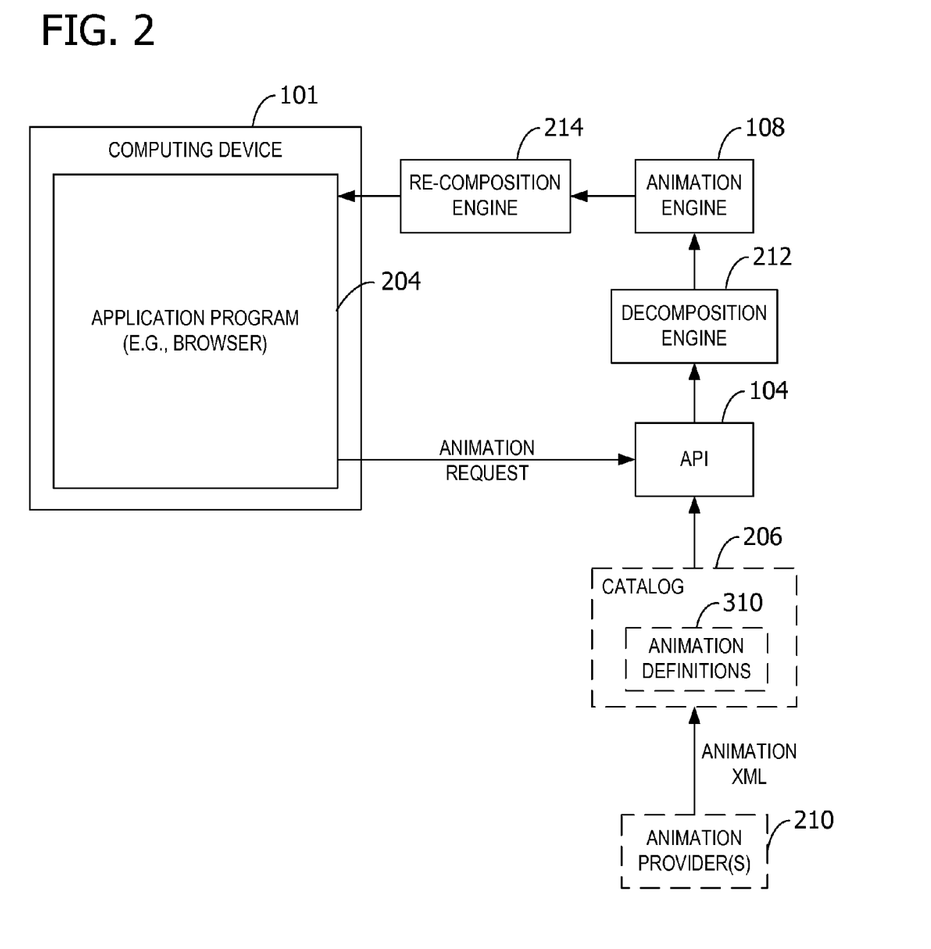
FIG. 2 is an exemplary block diagram illustrating processing of an animation request using a decomposition engine, an animation engine, and a re-composition engine.

Referring next to FIG. 2, an exemplary block diagram illustrates processing of an animation request using a decomposition engine 212, the animation engine 108, and a re-composition engine 214. The application program 204 is executed by, or otherwise associated with, the computing device 101. The computing device 101 may be any device programmed to perform operations as described and illustrated herein (e.g., see FIG. 3). In some embodiments, the application program 204 is a browser executing on the computing device 101. Aspects of the disclosure support different browser capabilities. For example, based on the browser type, the ML element to be animated may be coded in JAVASCRIPT scripting language or cascading style sheets (e.g., CSS3). In either of these examples, aspects of the disclosure are capable of preparing the ML element for animation.

In the example of FIG. 2, the application program 204 sends an animation request to the animation engine 108 using at least one of the APIs 104. For example, the application program 204 may request that a particular ML element be moved 50 pixels to the right of its current location. While shown external to the computing device 101 in FIG. 2, the APIs 104, or a portion thereof, may be stored and invoked locally on the computing device 101. The decomposition engine 212, or other layer between the application program 204 and the animation engine 108, receives or intercepts the animation request from the application program 204. For example, the decomposition engine 212 prepares the ML element for animation and sends the animation request with the prepared ML element to the animation engine 108 for animation. In some embodiments, preparing the ML element for animation includes adding, removing, and/or otherwise changing metadata associated with the ML element.

During and/or after animating the ML element as requested (e.g., the animation being displayed by the computing device 101), the animation engine 108 modifies attributes of the ML element to reflect the animation. The ML element with the modified attributes is made available to the re-composition engine 214. For example, the ML element with the modified attributes is provided as part of a function call (e.g., finish or completion function) that resets or cleans up the animation. The re-composition engine 214, or other layer between the animation engine 108 and the application program 204, prepares the ML element after animation for processing by the application program 204 by, for example, resetting the ML element to its original, legacy layout. In some embodiments, the re-composition engine 214 prepares the ML element by adding, removing, and/or otherwise changing metadata associated with the ML element. The re-composition engine 214 provides the prepared ML element to the application program 204.

In some embodiments, the animation engine 108 is decoupled from animation definitions 310 describing the requested animation. While aspects of the disclosure are not limited to such a configuration, these embodiments contemplate a catalog 206 that includes the animation definitions 310 accessible by the animation engine 108 via, for example, the API 104. For example, the animation request and the animation definition(s) 310 corresponding to the requested animation are identified and provided as input to the animation engine 108. For example, the API 104 may identify the corresponding animation definition 310 or the animation engine 108 itself may obtain the corresponding animation definition 310. The animation engine 108 performs the animation based on the animation request and the animation definition 310 for display on the computing device 101 (e.g., by the application program 204).

Continuing the example in which the animation engine 108 is decoupled from the animation definitions 310, one or more animation providers 210 provide animation code (e.g., animation extensible markup language code) describing one or more animations for storage in the catalog 206. The animation code may be generally referred to as animation definitions 310, although in some embodiments the animation code from the animation providers 210 may be conformed or altered to create an animation definition 310 suitable for storage in the catalog 206. The catalog 206 may be external to the computing device 101 as shown in FIG. 2, or may be stored on the computing device 101 (e.g., as a library) with the animation engine 108 (not shown). The animation engine 108 may access the catalog 206 to obtain the animation definitions 310 (e.g., using an animation identifier or other pointer or reference included in the animation request), or may receive the animation definitions 310 from the catalog 206 via another component or device (e.g., the API 104).

Figure 3:
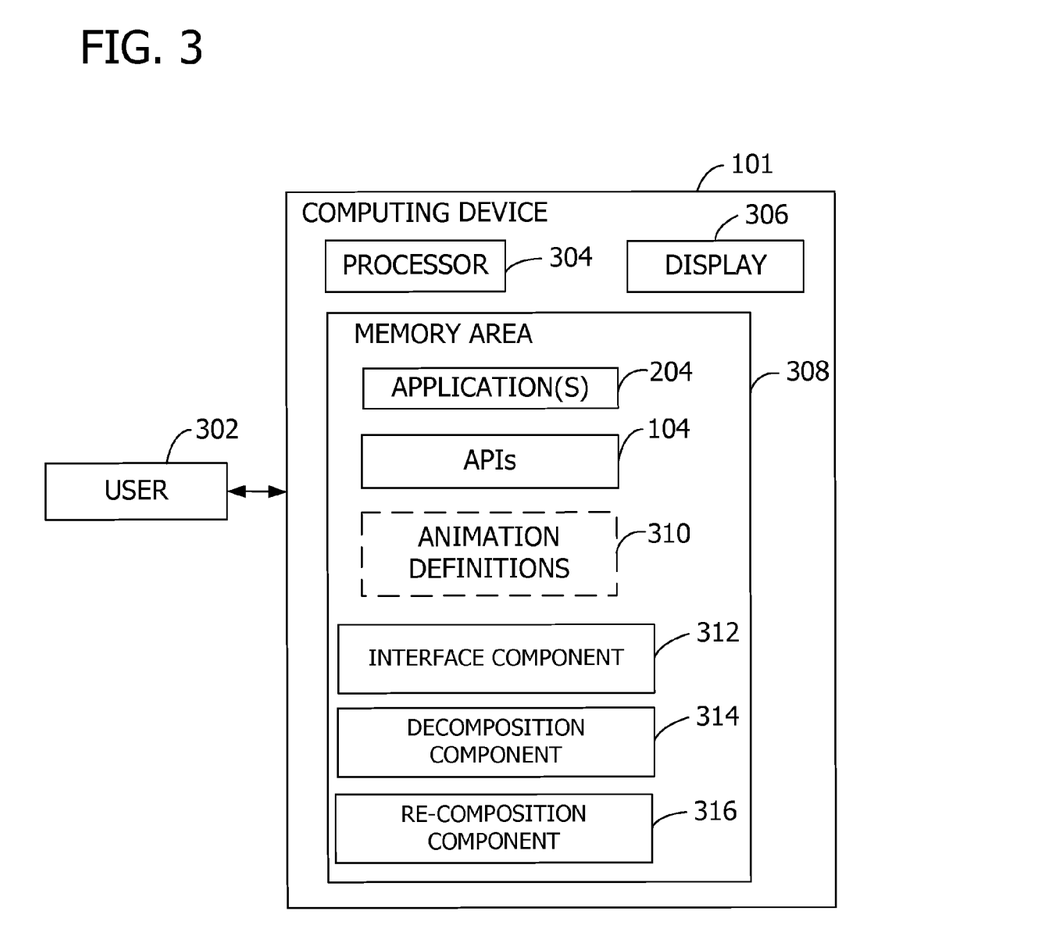
FIG. 3 is an exemplary block diagram illustrating a computing device storing computer-executable components for decomposing and re-composing a markup language (ML) element for animation by an animation engine.

Referring next to FIG. 3, an exemplary block diagram illustrates the computing device 101 storing computer-executable components for decomposing and re-composing an ML element for animation by the animation engine 108. In this example, the computing device 101 is associated with a user 302 and represents a system for preparing legacy ML elements for animation. The computing device 101 may be any device executing instructions (e.g., as application programs, operating system functionality, or both) to implement the operations and functionality associated with the computing device 101. The computing device 101 may include a mobile computing device or any other portable device. In some embodiments, the mobile computing device includes a mobile telephone, laptop, tablet, computing pad, netbook, gaming device, and/or portable media player. The computing device 101 may also include less portable devices such as desktop personal computers, kiosks, and tabletop devices. Additionally, the computing device 101 may represent a group of processing units or other computing devices.

The computing device 101 has at least one processor 304, a memory area 308, and at least one display 306. The processor 304 includes any quantity of processing units, and is programmed to execute computer-executable instructions for implementing aspects of the disclosure. The instructions may be performed by the processor 304 or by multiple processors executing within the computing device 101, or performed by a processor external to the computing device 101. In some embodiments, the processor 304 is programmed to execute one or more of the instructions illustrated in the figures (e.g., such as in FIG. 4 and FIG. 5).

The computing device 101 further has one or more computer readable media such as the memory area 308. The memory area 308 includes any quantity of media associated with or accessible by the computing device 101. The memory area 308 may be internal to the computing device 101 (as shown in FIG. 3), external to the computing device 101 (not shown), or both (not shown).

The memory area 308 stores, among other data, one or more applications. The applications, when executed by the processor 304, operate to perform functionality on the computing device 101. Exemplary applications include mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The memory area 308 further stores one or more of the APIs 104 for preparing the ML elements for animation. For example, the APIs 104 may be stored as a library loaded by a browser during runtime. In embodiments in which the computing device 101 executes the animation engine 108 to animate the ML elements, the memory area 308 may store the animation definitions 310.

The memory area 308 further stores one or more computer-executable components. Exemplary components include an interface component 312, a decomposition component 314, and a re-composition component 316. Operation of these components is described below with reference to FIG. 4.

The computing device 101 includes at least one display 306 or other means for displaying the animations to the user 302, along with computer-executable instructions (e.g., a driver) for operating a graphics card to enable the display 306.

In some embodiments, the computing device 101 also includes a communications interface such as a network interface card and/or computer-executable instructions (e.g., a driver) for operating the network interface card.

Figure 4:
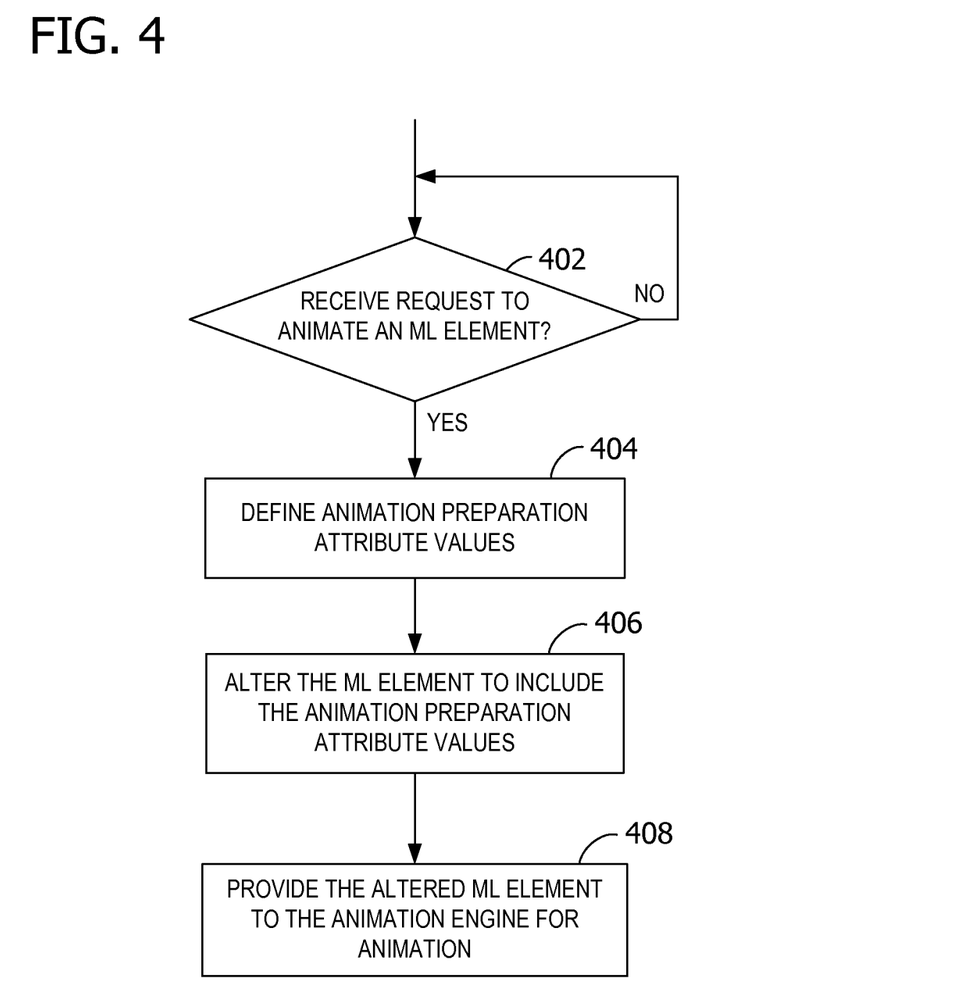
FIG. 4 is an exemplary flow chart illustrating the preparation of an ML element for animation by the animation engine.

Referring next to FIG. 4, an exemplary flow chart illustrates the preparation of at least one of the ML elements for animation by the animation engine 108. If the computing device 101 receives a request to animate at least one ML element at 402, the computing device 101 defines one or more animation preparation attribute values at 404. The request may be received from the application program 204 or other calling code 102. The ML element (or pre-animation ML element) has one or more current attribute values associated therewith. Defining the animation preparation attribute values includes selecting at least one attribute that is either within the pre-animation ML element already or to be added to the pre-animation ML element. The attribute is selected based at least on the requested animation (e.g., move, fade, etc.). Exemplary attributes (e.g., style attributes) include position, height, width, and opacity, though other attributed are contemplated. The position attribute may be a two-dimensional value such as (x,y), three-dimensional value such as (x,y,z), or otherwise. The units of measure for the position, height, and width attributes are represented as pixels, in some embodiments. The opacity may be represented as a percentage or with another metric. Other attributes are contemplated to be within the scope of the disclosure.

The animation definition 310 and/or animation preparation attribute value may be defined for the selected attribute based at least on information included in the animation request (e.g., the requested animation and the current attribute values). For example, the animation request may indicate that a particular ML element should be moved by 50 pixels. In this example, the "move" request identifies which of the animation definitions 310 to select.

At 406, the ML element is altered to include the defined animation preparation attribute values. In some embodiments, metadata associated with the ML element may be altered. For example, the ML element may be modified to include the selected attribute(s) and the defined animation preparation attribute values. At 408, the altered ML element is provided or made accessible to the animation engine 108. In examples in which the computing device 101 executes the animation engine 108, the altered ML element may be identified to the animation engine 108 via a pointer or other reference to memory. In examples in which the animation engine 108 is executed by another device, the computing device 101 may send the altered ML element to that device in a message or other communication.

The animation engine 108 animates the altered ML element using at least the defined animation preparation attribute values. Aspects of the disclosure are operable with any animation engine 108 that animates ML elements. Further, in some embodiments, the computing device 101 alters a plurality of ML elements and performs a plurality of animations based on the received animation request.

Example scenarios that involve defining the animation preparation attribute values, altering the ML element, and animating the altered ML elements are next described. Those skilled in the art will appreciate that the disclosure is not limited to the examples described herein, and that other animation preparation attribute values and changes made to the ML elements are within the scope of the disclosure. Further, examples of APIs 104 provided by aspects of the disclosure are described in Appendix A.

If the animation request is directed to re-positioning the ML element within a browser, offset coordinates are received from the browser. Absolute coordinates are defined based on the offset coordinates, and one or more of the attributes of the ML element are changed to include the defined absolute coordinates. In an example in which the ML element is an HTML element, aspects of the disclosure perform a "move" animation by changing the values of the "top" and "left" attributes of the HTML element. The computing device 101 may manipulate a document object model (DOM) representing the HTML element by lifting fields, portions, attributes, values, or other elements from the DOM layout and positioning them as "relative" or "absolute" so that the "top" and "left" attribute values become effective. In this manner, the HTML element starts moving from its exact initial position instead of a jerk before the motion starts.

If the application program 204 requests that existing content in one area of the display 306 be replaced with new content, aspects of the disclosure animate the existing content fading or moving out simultaneously while the new content animates into the display 306. In such examples, the computing device 101 creates a copy of the animation area and performs two animations simultaneously.

If the application program 204 requests that content be shown inline with the ML element, aspects of the disclosure animate an inline bounding box within the ML element to display inline comments or on-demand information on blogs, discussions, feeds, or the like. For example, the computing device 101 may layout the content to determine the target size of the bounding box, and then expand white space to the target size.

If the application program 204 requests that animations be performed on a table, aspects of the disclosure insert, delete, and/or move rows and/or columns of data. The cells, rows, and/or columns are manipulated as separate ML elements.

Upon completion of the animation, attributes of the ML element have been updated to reflect completion of the animation. In some embodiments, the ML element after animation is the same ML element prior to animation, but with an updated state reflecting the post-animation attributes and values. The animation engine 108 may also provide the computing device 101, application program 204, or other calling code 102 an indication that animation of the altered ML element has completed. In embodiments such as described below with reference to FIG. 5, the ML element may be modified after animation in preparation for consumption by the requesting application program 204. For example, the defined animation preparation attribute values may be removed from the ML element during and/or after animation.

In some embodiments, the computer-executable components illustrated in FIG. 3 execute to implement one or more of the operations illustrated in FIG. 4. For example, the interface component 312, when executed by the processor 304, causes the processor 304 to receive, from the application program 204, one or more requests to perform a plurality of animations on at least one ML element. In some embodiments, the interface component 312 increments a reference counter for each of the received requests that operate on the same ML element. Exemplary requests include one or more of the following: move at least one cell in a table, insert at least one row in a table, remove at least one row from a table, re-order cells within a table, fade-in at least one cell in a table, and fade-out at least one cell in a table The decomposition component 314, when executed by the processor 304, causes the processor 304 to alter the ML element to include one or more animation preparation attribute values based at least on the animations and the current attribute values in the requests received by the interface component 312. The animation engine 108 performs the plurality of animations on the altered ML element using at least the defined animation preparation attribute values to update attributes of the ML element. In this example, at least two of the animations complete at different times.

The re-composition component 316, when executed by the processor 304, causes the processor 304 to remove the animation preparation attribute values from the ML element upon completion of the last animation. For example, the re-composition component 316 decrements the reference counter upon completion of each of the requested animations. In this example, the re-composition component 316 removes the animation preparation attribute values only upon completion of the last-to-finish animation (e.g., when the reference counter has a value of zero).

The interface component 312 further provides, to the application program 204, the ML element with the animation preparation attributes removed by the re-composition component 316.

Figure 5:
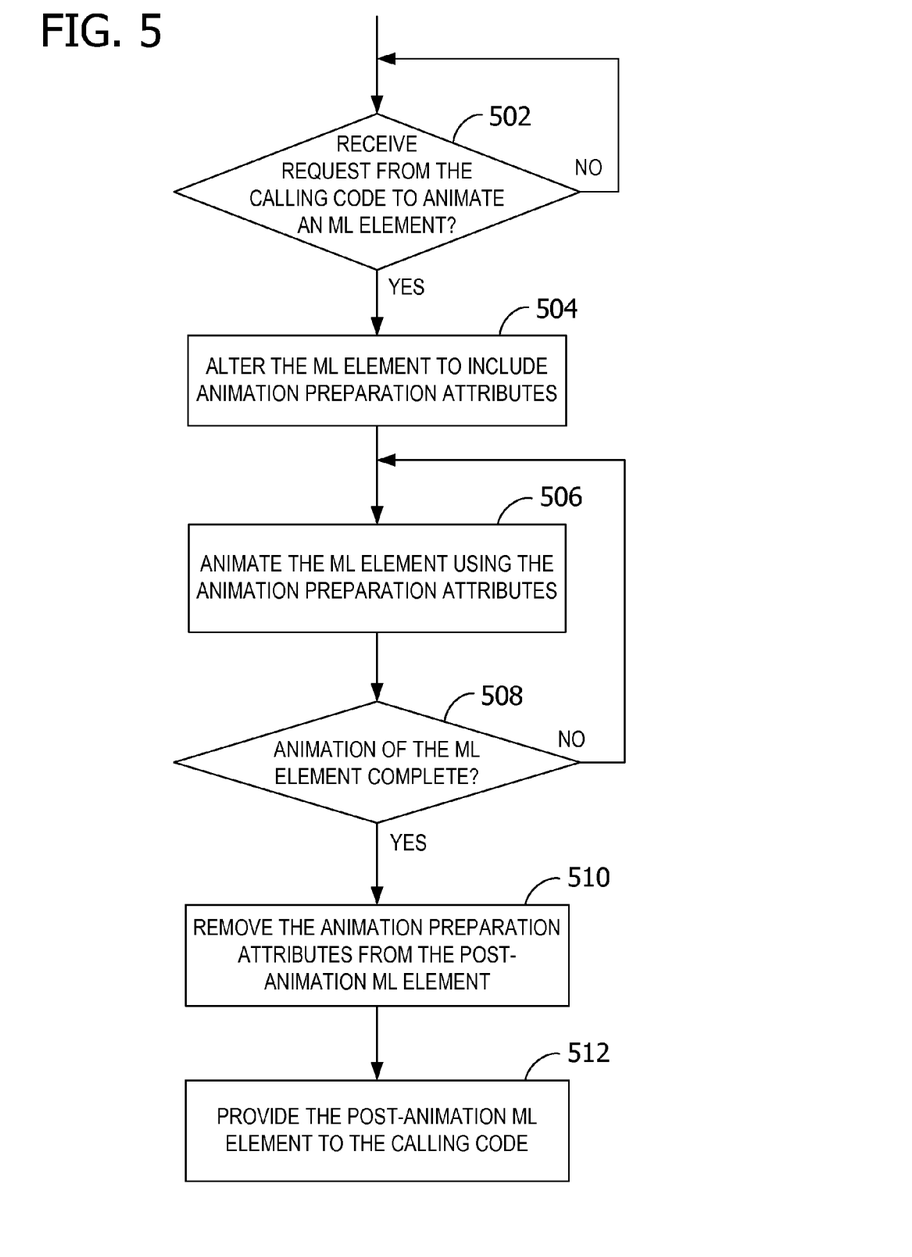
FIG. 5 is an exemplary flow chart illustrating the inclusion and removal of animation preparation attributes in an ML element.

Referring next to FIG. 5, an exemplary flow chart illustrates the inclusion and removal of animation preparation attributes in the ML element. If an animation request is received from the application program 204 or other calling code 102 at 502, the ML element is altered to include one or more animation preparation attributes at 504. The animation preparation attributes and corresponding animation preparation attribute values are selected and/or defined based at least on the requested animation. The computing device 101 or other device executing the animation engine 108 animates the ML element at 506 using at least the animation preparation attributes included in the altered ML element.

If animation of the ML element is complete at 508, attributes of the ML element are updated to reflect completion of the animation. The ML element is then altered to be recognizable by the requesting application program 204. For example, the animation preparation attributes and corresponding values added at 504 are removed from the ML element at 510. For example, different tags, recognizable by the requesting application program 204, may be defined to represent the state of the ML element post-animation. The altered ML element is provided to the requesting application program 204 at 512.

Additional Scenario Examples

Numerous scenarios for preparing the ML elements for animation are supported by the disclosure. The following implementations and/or structures supporting the scenarios are merely exemplary and not limiting in any way.

An exemplary implementation for re-positioning the ML element includes adding the animation preparation attribute "position" and the value "absolute" to the ML element. In this example, the absolute position does not depend on parent elements and is supported by multiple browsers. The "top" attribute value is computed as the sum of the offsetTop attribute values of all offsetParents of the ML element. The "left" attribute value is computed as the sum of the offsetLeft attribute values of all offsetParents of the ML element. For RightToLeft rendering, the right offset is used instead of the left offset. The right offset may be computed as (document.body.offsetWidth-element.offsetWidth-SPAnimationUtility.BasicAnimator.GetLeftOffset(element)). The height and width attribute values are set to the offsetHeight and offsetWidth, respectively, at least because the height and width are reset when absolute positioning removes an element from the DOM layout. The top and left attribute values are adjusted with the horizontal and vertical scroll offsets to account for the scroll position of an element on the screen when the browser window is scrolled.

An exemplary implementation for cloning the ML element includes cloning the original content into a copy placed exactly over the original content. Cloning may be accomplished by creating a new element with the same innerHTML tag as the original element. The new element is appended as a sibling of the original element. The original element is then made invisible (e.g., adjust the visibility or opacity). The content of the original element is replaced to the new content at the same location by using, for example, the positioning API described herein. The animation engine 108 runs two simultaneous animations to animate the original content out and to animate the new element in. Upon completion of the animation, the cloned element is removed from the DOM.

An exemplary implementation for animating a bounding box includes laying out the content element outside a viewport to determine the height and width of the content element. The animation engine 108 runs an animation to grow the bounding box to the determined height and width. The content element is re-positioned and faded in.

An exemplary implementation for animating tables includes preparing the table for animation by positioning each table cell as absolute (e.g., each cell is treated as a separate ML element so that each cell can be moved freely). In some embodiments, the margins, paddings, and borders around the cells are considered during positioning. In addition, aspects of the disclosure support different number of cells per row. The overall height and width on the table element is set to keep the page layout around the table undisturbed by the absolute positioning of table cells.

A wrapper API is used to manage row insertion, deletion, and movement. For example, input arguments to the wrapper API identify the rows or columns to insert, delete, and/or move in the table. The wrapper API runs these operations simultaneously to manage the animation. The wrapper API may also reset the animation preparation styles when the animations complete. To insert a row into the table, the table cells in the row are marked with an opacity value of zero, positioned within the table, and faded in. To delete a row from the table, the cells in the row are faded out each of the ML elements in the row. To move a row in a table, the distance of travel is computed as, for example, the product of the quantity of rows to move and the height of a row. The ML elements representing the cells in the row are moved by that distance.

When the overall height of the table changes after a table animation operation, the table footer is adjusted accordingly. For example, the change of height on the table element is animated for a smooth effect.

At least a portion of the functionality of the various elements in FIG. 1, FIG. 2, and FIG. 3 may be performed by other elements in FIG. 1, FIG. 2, or FIG. 3, or an entity (e.g., processor, web service, server, application program, computing device, etc.) not shown in FIG. 1, FIG. 2, or FIG. 3.

In some embodiments, the operations illustrated in FIG. 4 and FIG. 5 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 302. In such embodiments, notice is provided to the users 302 of the collection of the data (e.g., via a dialog box or preference setting) and users 302 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. In some embodiments, computer storage media are implemented in hardware. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for preparing the ML element for animation, and exemplary means for cross-browser animation of legacy HTML elements.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Exemplary APIs such as API 104 for implementing aspects of the disclosure are next described. In some embodiments, APIs for re-positioning the ML element include the following.

public static void PositionAbsolute(DOMElement element)

The above exemplary API lifts the ML element out of the DOM layout in preparation for a "move" animation, sets the position attribute to "absolute", and adjusts the left and top attribute values to match the exact initial position.

public static void PositionRelative(DOMElement element)

The above exemplary API lifts the ML element out of the DOM layout in preparation for a "move" animation, sets the position attribute to "relative", and adjusts the left and top attributes to match the exact initial position.

--- public static void PositionAbsoluteExact(DOMElement element, int topValue, int leftValue, int heightValue, int widthValue)

---

The above exemplary API lifts the ML element out of the DOM layout in preparation for a "move" animation, sets the position attribute to "absolute", and enables granular control of the intended position of the ML element.

```
public static void PositionRelativeExact(DOMElement element,
int topValue, int leftValue, int heightValue, int widthValue)
```

The above exemplary API lifts the ML element out of the DOM layout in preparation for a "move" animation, sets the position attribute to "relative", and enables granular control of the intended position of the ML element.

```
public static void ResetPosition(DOMElement element)
```
The above exemplary API resets the position styles, such as upon completion of the animation.

An API for creating a clone of the ML element for simultaneous animation with the ML element is shown below.

```
public static DOMElement CloneElement(DOMElement element,
bool fMakeTransparent, bool fInsertBefore)
```

The above exemplary API makes a copy of the original element and lays it exactly over the original. The fMakeTransparent argument sets the opacity of the original element to zero if true. The fInsertBefore argument inserts the clone element as previous sibling of the original element in the DOM if true. If false, the clone element is inserted as a next sibling.

An API for animating a bounding box is shown below.

```
public static void ResizeContainerAndFillContent(DOMElement
newElement, DOMElement parentNode, Callback finishFunc,
bool fAddToEnd)
```

The above exemplary API adds a content element (e.g., newElement) as a child of the parentNode argument with an animation that first grows some white space where the newElement content element will go and then fades the newElement content element into the white space. The newElement argument identifies the element to fade in, the parentNode argument identifies the element that will be the parent of the newElement content element, and the finishFunc argument identifies the callback function to run when animation completes. If the addToEnd argument is set to true, the newElement content element is the last child of the parent element. If the addToEnd argument is set to false, the newElement content element is the first child.

The exemplary APIs shown below for manipulating tables may be grouped into a class such as public class TableAnimator.

```
public TableAnimator(DOMElement table)
```
The above exemplary API creates and initializes a TableAnimator object.

```
public void AnimateRows(RowMoveInfo[ ] toMove, int[ ] toDelete,
RowAddInfo[ ] toAdd, DOMElement footer, Callback finishFunc)
```

The above exemplary API rearranges rows in table by inserting, deleting, or moving. The toMove argument identifies an array of rows to move (e.g., [currentRowIndex, newRowIndex]). The toDelete argument identifies an array of row indices to delete (e.g., [deleteRowIndex]). The rows are faded out in the specified indices, but the rows are not removed from the tables. The toAdd argument identifies an array of row indices to fade in (e.g., [row, newRowIndex]). The footer argument identifies the footer element below the table that needs to animate if the quantity of rows in the table are changing. The finishFunc argument identifies a callback function to run when animation completes.

```
public void DeleteRows(int[ ] toDelete, Callback finishFunc)
```
The above exemplary API performs a row delete animation in a table. The toDelete argument identifies an array of row indices to delete (e.g., [deleteRowIndex]). The rows are faded out. The finishFunc argument identifies a callback function to run when animation completes.

```
public void InsertRows(RowAddInfo[ ] toAdd, Callback finishFunc)
```
The above exemplary API performs a row insertion animation in a table. The toAdd argument identifies an array of row indices to fade in (e.g., [row, newRowIndex]). The finishFunc argument identifies a callback function to run when animation completes.

```
public void MoveRows(RowMoveInfo[ ] toMove, Callback finishFunc)
```
The above exemplary API performs a row move animation in a table. The toMove argument identifies an array of rows to move (e.g., [currentRowIndex, newRowIndex]). The finishFunc argument identifies a callback function to run when animation completes.

What is claimed is:

1. A system for animating legacy markup language (ML) elements, said system comprising:
   a memory area associated with a computing device, said memory area storing a plurality of application programming interfaces (APIs) for animating markup language (ML) elements; and
   a processor programmed to:
   receive, from an application program via at least one of the plurality of APIs stored in the memory area, a request to perform at least one animation on a ML element in a document, the ML element having one or more style attributes associated therewith;
   change the ML element within the document by including one or more animation preparation attributes within the ML element and modifying current values of the one or more style attributes, wherein the one or more animation preparation attributes are defined based on the requested at least one animation such that content from the changed ML element appears the same as before the ML element was changed, wherein the ML element is prepared for the requested at least one animation based on the change in the ML element;
   perform the requested at least one animation on the changed ML element using the defined one or more animation preparation attributes included therein;
   update the changed ML element, only after completing a last-to-finish animation from the requested at least one animation by removing the included one or more animation preparation attributes from the changed ML element and resetting the changed ML element to its original layout; and
   provide, to the application program, the updated ML element with the included one or more animation preparation attributes removed, the updated ML element indicating, to the application program, completion of the requested at least one animation.

2. The system of claim 1, wherein the request is to move cells within a table, and wherein the processor is further programmed to represent each of the cells as a separate ML element.

3. The system of claim 2, wherein the processor is further programmed to define absolute coordinates using offset coordinates received from the application program, and wherein the processor changes the ML element by changing at least one of the style attributes to include the defined absolute coordinates.

4. The system of claim 1, wherein the request is to replace the ML element, and wherein the processor is further programmed to create a copy of the ML element for simultaneous animation with the ML element.

5. The system of claim 1, wherein the request is to show inline content of an inline bounding box, and wherein the processor is further programmed to determine a size of the inline content and animate the inline bounding box that grows to the determined size for containing the inline content.

6. The system of claim 1, wherein the application program is a browser and the ML element is a hypertext markup language (HTML) element.

7. The system of claim 1, wherein the memory area further stores a library of the animation preparation attributes.

8. The system of claim 1, further comprising means for cross-browser animation of legacy hypertext markup language (HTML) elements.

9. A method comprising:
receiving, by a computing device from an application program, a request to perform at least one animation on a markup language (ML) element, the ML element having one or more style attributes associated therewith;
changing the ML element by including one or more animation preparation attributes within the ML element and modifying current values of the one or more style attributes, the one or more animation preparation attributes being defined based on the requested at least one animation such that content from the changed ML element appears the same as before the ML element was changed, wherein the ML element is prepared for the requested at least one animation based on the change in the ML element;
performing the requested at least one animation on the changed ML element using the defined one or more animation preparation attributes included therein;
update the changed ML element, only after completing a last-to-finish animation from the requested at least one animation by removing the included one or more animation preparation attributes from the changed ML element and resetting the changed ML element to its original layout; and
provide, to the application program, the updated ML element with the one or more animation preparation attributes removed, the updated ML element indicating, to the application program, completion of the requested at least one animation.

10. The method of claim 9, further comprising receiving an indication from the animation engine that animation of the changed ML element has completed.

11. The method of claim 9, wherein animation of the changed ML element produces the updated ML element.

12. The method of claim 9, further comprising providing the changed ML element to the animation engine for animation.

13. The method of claim 9, wherein receiving the request to perform the at least one animation comprises receiving a function call from an application program via an application programming interface.

14. The method of claim 9, further comprising:
selecting the one or more style attributes associated with the ML element based on the request; and
defining one or more animation definitions for the selected one or more style attributes based on the current attribute values, wherein the changed ML element is animated based on the defined one or more animation definitions.

15. The method of claim 9, wherein the application program is a browser and the ML element is a hypertext markup language (HTML) element.

16. The method of claim 9, further comprising creating a copy of the at least one ML element for simultaneous animation with the at least one ML element.

17. One or more computer storage media embodying computer-executable components, said components comprising:
an interface component that on execution causes at least one processor to receive, from an application program, a request to perform an animation on a markup language (ML) element, the ML element having one or more style attributes associated therewith;
a decomposition component that on execution causes at least one processor to change the ML element by including one or more animation preparation attributes within the ML element and modifying current values of the one or more style attributes, wherein the one or more animation preparation attributes are defined based on the requested animation such that content from the changed ML element appears the same as before the ML element was changed, wherein the ML element is prepared for the requested animation based on the change in the ML element;
an animation engine component that on execution causes at least one processor to perform the requested animation on the changed ML element using the defined one or more animation preparation attributes included therein; and
a re-composition component that on execution causes at least one processor to update the changed ML element, after completing a last-to-finish animation from the requested animation by removing the included one or more animation preparation attributes from the ML element and resetting the changed ML element to its original layout,
wherein the interface component further provides, to the application program, the updated ML element with the one or more animation preparation attributes removed by the re-composition component, the updated ML element indicating, to the application program, completion of the requested animation.

18. The computer storage media of claim 17, wherein the interface component increments a reference counter for the received request, and wherein the re-composition component decrements the reference counter upon completion of the requested animation.

19. The computer storage media of claim 18, wherein the re-composition component removes the one or more animation preparation attribute values based on determining that the reference counter has a value of zero.

20. The computer storage media of claim 17, wherein the interface component receives one or more of the following requests: move at least one cell in a table, insert at least one row in a table, remove at least one row from a table, re-order cells within a table, fade-in at least one cell in a table, and fade-out at least one cell in a table.

* * * * *